AIR NAVIGATION INFORMATION SYSTEM

Filed May 4, 1961 4 Sheets-Sheet 1

Inventor
JACQUES VILLIERS
By Percy P. Lantzy
Attorney

AIR NAVIGATION INFORMATION SYSTEM

Filed May 4, 1961 4 Sheets-Sheet 2

Inventor
JACQUES VILLIERS
By Percy P. Lantzy
Attorney

Jan. 26, 1965 J. VILLIERS 3,167,759

AIR NAVIGATION INFORMATION SYSTEM

Filed May 4, 1961 4 Sheets-Sheet 3

Inventor
JACQUES VILLIERS
By Percy P. Lantzy
Attorney

Inventor
JACQUES VILLIERS
By [signature]
Attorney

United States Patent Office 3,167,759

Patented Jan. 26, 1965

3,167,759
AIR NAVIGATION INFORMATION SYSTEM

Jacques Villiers, Paris, France, assignor to International Standard Electric Corporation, New York, N.Y., a corporation of Delaware Filed May 4, 1961, Ser. No. 126,736
Claims priority, application France, May 5, 1960, 826,282, Patent 1,269,616
10 Claims. (Cl. 343—6)

This invention relates to an air navigation control system and more particularly to arrangements permitting a one ground station, on the one hand to locate mobile stations moving in a predetermined space and to establish selective communications successively with each mobile station according to the position thereof respectively, and on the other hand to communicate the coordinates, characteristics and code messages from said mobile stations automatically over telephone lines.

Numerous radio navigation systems are known which permit a mobile station to have its position known in the space. Also, coding and transmission processes are known the purpose being to establish selective communication between one ground station and mobiles within a multiplex network operated in shared time with each channel designated by the call used as coded address. The above processes present many drawbacks, and particularly there is required at the mobile stations, complex call decoding and mobile coordinate coding. Further they do not permit the mobiles which were not signalled from the ground by other means to come in the said multiplex network.

Moreover, arrangement exist which permit a ground station to obtain the position of the mobiles included in a predetermined space. Such arrangements as radars, the VORDAR (U.S. patent application, Serial No. 3,171, filed January 18, 1960, by Jacques Villiers for "Rotating Radio-Beacon System for Locating Objects") and Omnidirectional altimetric radar (U.S. patent application, Serial No. 93,698, filed March 6, 1961, by Jacques Villiers) provide a space scanning whereby, at the moment of the sweeping on a mobile, an echo or response signal is created, the ground reception time of which permits the position of the mobile from the ground station to be determined.

The time interval which may be allowed for a predetermined mobile station in such a sweeping varies in inverse function of the required separating power and in any case is always very short. For example, in a well known azimuth and bearing sweep, a resolution of 3 kilometers in distance limits up to 20$\mu$'s the available time for a predetermined craft and reduces the air-group transmission capabilities to a new simply coded message and prevents any immediate ground-air response.

Finally, a so-called DATARAMA arrangement is known, U.S. application S.N. 45,383, filed July 26, 1960 for "Air Radio Navigation Systems" by. J. Villiers, based on conventional radionavigation systems using a scanning beam which permits the establishment of selective bilateral communications between one ground station and some mobiles called in accordance with their positions successively in the space control of the said ground station. The principle used in the arrangement consists in stopping the beam sweep for a predetermined time intervals by action of a response signal transmitted from a mobile station caused by sweep of the beam over the station. This permits compatible use of a space scanning rapid enough for providing a suitable repetition of data with the allotment for each aircraft of a sufficient time for the selective communication link establishment. The process initiates the transmission from a ground station simultaneously with the azimuth sweeping of an omnirange beacon of coded signals designating radial distances or altitudes to be compared on board of mobiles with their proper coordinate measurements. The main drawback of the said process is the required addition of rather complex arrangements to mobile conventional equipments.

It is noted further that the remote transmission of data concerning mobile positions generally requires the use of broad pass-bands or complex transformation with these prior art arrangements.

According to the present invention the principle of a rapid stop of the beam sweep upon passing the craft for a sufficient time for air-ground and ground-air communication exchange as disclosed in the above application, is applied to different space sweeping modes which permit on the one hand to avoid expensive and complicated board equipments, and on the other hand give the craft coordinates in a form easy to transmit on a telephone line and to store in any digital coded computors.

A general purpose of the invention is to provide an improved air navigation control system with good reliability in connection with the already used radionavigation arrangements and needing only telephone lines between ground stations.

A general feature of the invention relates to means for creating different space sweeping modes, in two or three dimensions according to space-discontinuous-sweeping laws described in the earlier application or combination of said space-discontinuous sweeping laws with other known laws, to obtain therefrom the position of mobile stations moving in a determined space and for establishing successively with each of these mobiles an air-ground coded link followed immediately by selective ground-air coded link.

According to the invention ground stations are provided with means for transmitting an easily recognized pulse signal according to variable predetermined positions of the mobile position line, initiated therefrom and the mobile stations are provided with means for transmitting a signal responsive to said pulse signal, said pulse signal arriving at mobile stations a predetermined interval after the time when said mobile stations are swept by the mobile position line. In the absence of response signal the designated position of the mobile position line is modified to provide a half deviation thereof during said response duration. In the contrary case, the same position is designated during the necessary number of sweeping cycles for the air-ground then ground-air coded information exchange successively, for each craft that has replied to the response signal.

For example, if the mobile position line is considered as a rotating vector, as in case of rotating beacon, the said pulse signal thus designates a sector of predetermined $\theta$ azimuth and $\Delta\theta$ angle. In case of an ominidirectional altitude radar, it designates a horizontal portion comprised between $h$ and $h+\Delta h$ levels. The $\Delta\theta$ and $\Delta h$ values, according to the mobile sharing standards, determine in every case the response delay duration.

The ground stations are provided with means for translating the craft coordinates known from the reception time of response signals thereof, as well as call-signal and other received coded information thereof, into digital form for transmission on a transmission channel of narrow pass-band.

Decoding and use of these coordinates as well as cathode screen displays can be effected in a control station linked by telephone line to the radio navigation system. The ground reception of a call signal initiates by known means the search, in storage devices, of coded messages having the same call signal for address and transmission thereof to the concerned aircraft as soon as the air-ground information transmitted by said aircraft is completed.

A particular object of the invention is to initiate from a rotating beacon an azimuth and distance space discontinuous sweeping characterized in this that the azimuth sweeping for signal transmission is separated from the rotation of the radiation pattern of the rotating beacon, the transmission of a response signal by the mobile stations is subordinated to their presence in a determined sector of the beacon designated by a particular signal. This sweeping mode will be called hereinafter "indicated sector sweeping."

Another particular object of the invention is to initiate a distance and altitude space discontinuous sweeping characterized in this that the radiation of a response signal by the mobile stations is subordinated to their presence in a horizontal slice of predetermined thickness and altitude designated by a particular signal. This sweeping mode will be called hereinafter "indicated level sweeping."

Another particular object of the invention is to obtain alternatively an indicated sector sweeping and an indicated level sweeping.

Another particular object of the invention is the association of an altitude and distance sweeping such as sweeping of the omnidirectional altitude radar with an indicated sector sweeping in order to obtain an indicated sector volumetric sweeping.

Another particular object of the invention is the association of an azimuth and distance sweeping such as the VORDAR sweeping with an indicated level sweeping in order to obtain an indicated level volumetric sweeping.

The invention will be hereinafter described in connection with an embodiment provided for space sweeping modes based on the standard radio navigation system of I.C.A.O. (International Civil Aviation Organization) called VORTAC, but those skilled in the art can easily, without departing from its scope, extend the application to other sweeping modes based on the same radio navigation system or on other existing or future radio navigation systems. The sweeping modes which are more specifically concerned, by way of examples, in the following description are the indicated sector sweeping, the indicated level sweeping, the alternate indicated sector and indicated level sweepings, and the indicated level volumetric sweeping.

A VORTAC ground station comprises:

(*a*) A VOR radio beacon (Very High Frequency Omnirange) radiating on the 112–119 mc.p.s. frequency band two signals the frequency of which $f_1=30$ c.p.s., the first signal being called reference signal, omnidirectionally frequency modulated by a sub carrier wave of frequency $F=9,960$ c.p.s., and the second signal called measuring signal, according to a cardioid radiation pattern rotating at 30 revolutions per second, so that in every point M of the space the phase difference between these two siganls is equal to the azimuth of point M seen from the radio beacon.

(*b*) A responder so-called DME/T (Distance Measuring Equipment utilized with the Standard military Tacan system) which radiates, in response to interrogation signals transmitted by aircrafts on a carrier wave in the 1,000 mc.p.s. frequency band, response signals on another frequency of the same frequency band.

The corresponding equipment of the mobile stations comprises:

(*a*) Means for measuring the phase difference between the signals of frequency $f_1$ of the VOR radio beacon and to obtain therefrom their azimuth $\theta$ with respect to the radio beacon;

(*b*) Means for identifying DME/T signals responding to their proper interrogation signals (due to the random character of the interrogation moment) and to obtain therefrom their distance from the radio beacon.

According to the invention, the equipment of the VORTAC ground stations further comprises means for radiating easily recognizable pulse signals having a predetermined phase relationship depending upon VOR reference signal $f_1$ or upon an $f_1$ multiple frequency signal the phase of which depends upon the VOR reference signal.

These pulse signals are hereinafter called $S\theta$ and $Sh$ according to their coding identification.

The aircrafts being provided with known means for decoding signals $S\theta$ and $Sh$ and for responding them in conditions which will be described hereinafter, the said signals are useful for measuring distance and identifying either an azimuth $\theta$ or an altitude $h$.

INDICATED SECTOR SWEEPING

Upon the reception of the VOR signals, the aircraft which discriminate the reference signal obtained by demodulation of the F frequency sub carrier wave, and the $\varphi(\theta)$ phase azimuth measuring signal, obtain by known means, from these $f_1$ frequency signals, pulses $i\theta$ of $\tau\theta$ duration at the moment where the sinusoid representing signal $f_1\varphi(\theta)$ passes through zero by increasing values.

Pulses $i\theta$ are unblocking pulses of the $\tau\theta$ duration. The response signal R that the aircraft are in a position to radiate through their DME transmitter upon the reception of a signal $S\theta$, cannot be transmitted until the $i\theta$ pulses are simultaneously present.

The reception by a ground station of a signal R in response to a signal $S\theta$ is characteristic of an aircraft positioned at a distance proportional to the time interval between these two signals and in the sector comprised between the indicated azimuth $\theta d$ and the azimuth $\theta d-\Delta\theta,\Delta\theta$ being the rotation angle of the VOR cardioid during the time $\tau\theta$.

In the absence of any aircraft at a control distance from the ground station, for instance no aircraft at less than 300 kilometers in the said sector, and therefore in the absence of response R in two milliseconds after the radiation of a signal $S\theta$, the azimuth to be indicated upon the following revolution of the VOR cardioid, i.e. $\frac{1}{30}$ second later, is increased by $$\frac{\Delta\theta}{2}$$

by means of a step-by-step motor actuating an appropriate phase converter.

If there is an aircraft response R to a signal $S\theta$, a proceed-to-code signal K is transmitted without delay by the DME/T transmitter and the indicated azimuth is held during three cardioid revolutions, i.e. $\frac{3}{30}$ second, that is to say the radiation of signals $S\theta$ and the advance of the indicated azimuth control step-by-step motor are blocked during two cardioid revolutions.

The aircrafts having means for filtering upon the reception of pulse signals responding to signals from their proper DME transmitter, and for admitting them in a particular channel called "filtered video" channel, signal K appears in the filtered video channel of the sole aircraft having radiated the signal R to which it responds and initiates a ($\frac{2}{30}$ sec.) air-ground coded transmission cycle, and then a ($\frac{1}{30}$ sec.) ground-air cycle.

If there is more than one aircraft response to a signal $S\theta$, the transmission of signal K and the blocking of $S\theta$ signal transmission during two cardioid revolutions take place as for only one response, but the advance of the indicated azimuth control step-by-step motor is not unblocked upon the third cardioid revolution and a particular coding azimuth repetition signal $S\theta r$ is radiated, to which respond only the aircraft having no turn of communication since the last signal $S\theta$.

The radiation of azimuth repetition signals $S\theta r$ and the same processes are repeated until the responses in the indicated sector are exhausted.

In each of the successively indicated sectors, the aircrafts thus receive by turns, according to an order of increasing distances, from the ground station, a proceed-to-code signal. Each aircraft can thus transmit to ground its call-signal, speed, head and other coded information in a particular message as soon as the transmission channel has been granted to the said aircraft. Upon the reception of the call signal of an aircraft by the ground station, known devices search a memory and if there is a waiting message for the aircraft having this call-signal, initiate the transmission of this message as soon as an air-ground end-of-message signal from the said aircraft has been received. As the decoding channel of the coded messages is opened on aircraft board only upon the transmission of an air-ground end-of-message signal, only the concerned aircraft decodes this ground-air message.

The angular step between two sectors of $\Delta\theta$ angle successively indicated being $\Delta\theta/2$, the allotment of the transmission channel is repeated for each aircraft in the two successive sectors. The azimuth of each aircraft is thus known by the ground station with the precision $$\pm\frac{\Delta\theta}{4}$$

The duration of a complete revolution of the discontinuous sweeping thus carried out depends upon the angle $\Delta\theta$ of each indicated sectors and upon the number of the aircrafts simultaneously moving in the control space of the VORTAC station.

By taking $\Delta\theta=15°$ from which an angular step of $$\frac{\Delta\theta}{2}=7.5°$$

and in the absence of any aircraft response, this time is:

$$\tau\theta=\frac{1}{30}\times\frac{360}{7.5}=1.6^{s}$$

for 50 aircrafts, for each of which twice 3/30 second is allotted, it is up to:

$$T\theta=t\theta+50\times\frac{3}{30}\times 2=11\frac{2}{3}^{s}$$

The transmission of the information received by a VORTAC station at a control center is particularly simple and can be effected by a usual telephone line. The distance and azimuth of each aircraft are respectively provided under a binary form by means of a binary computer initiated upon each signal $S\theta$ or $S\theta r$ and stopped upon the first response R and by means of a binary coding disc wedged on the shaft of the indicated azimuth control step-by-step motor. The call signal and coded information of the aircrafts being transmitted thereby in a 750 bauds binary code are directly routed on a telephone line of the VORTAC station to the control center and are followed by reading signals at the same speed as the distance meter and azimuth disc.

INDICATED LEVEL SWEEPING

Aircrafts being equipped with known means for phase shifting the $f_1$ frequency reference signal of the VOR depending upon their altitude, for instance, 4.5° for 150 meters, and for deducing the unblocking pulses $ih$ of $\tau h$ duration of the signal $f_1\varphi(h)$ thus phase shifted, respond by signals R to indicated altitude signals $Sh$ or repeated altitude signals $Shr$ under conditions similar to those of the indicated sector sweeping.

The duration of a sweeping cycle of 0 to 12,000 meters with 50% overlapping between slices of 150 meters thickness successively indicated, is in the absence of any response signal:

$$th=\frac{1}{30}\cdot 2\cdot\frac{12000}{150}=5\frac{1}{3}^{s}$$

and with 50 aircrafts:

$$Th=th+50\times\frac{3}{30}\times 2=15\frac{1}{3}^{s}$$

According to the air navigation control it is considered that to avoid collision dangers between transit aircrafts, a separation in altitude, of $\Delta h=150$ meters is to be maintained. The indicated level sweeping presents the advantage of classifying the aircrafts in an order which considerably facilitates the automatic conflict research.

Moreover, the aircraft signals responding to same level repetition or indication signals being classified according to their distance independently of their azimuth, it is also easy to verify if aircraft following convergent flight paths towards the ground station have flight moments over the said station suitably separated for instance by at least ten minutes interval as at the present time provided.

ALTERNATE INDICATED SECTOR SWEEPING AND INDICATED LEVEL SWEEPING

Aircrafts being provided with means for discriminating indicated azimuth signals from indicated altitude signals and for switching them in distinct channels, it is easy to provide the alternation of a cycle $T\theta$ and of a cycle $Th$. There is then obtained in a time comprised between $$t\theta+th=1.6^{s}+5.33^{s}\#7^{s}$$

and $$T\theta+Th=11.6^{s}+15.33^{s}\#27^{s}$$

according to the number of aircrafts, between zero and fifty, moving in the control volume of the ground station and for each aircraft, four air-ground and then ground-air coded information exchanges, two of which are consecutive to a distance and azimuth measurement, the two others being consecutive to a distance and altitude measurement. This data capable of being directly transmitted by a telephone line, a control center can be provided with:

Selective means for information exchanges with each aircraft,

Elements suitable for bringing up to date a particular storage allotted to each aircraft indicated by its call signal, by renewed information on its three coordinates, distance, azimuth and altitude, as well as eventually its heading and speed;

Elements suitable for the establishment of a cathode screen display of the azimuth and distance position of each aircraft with recording its call signal and altitude opposite to the corresponding spot;

Elements suitable for the establishment on a cathode screen of a display, conjugated with the preceding one, of the distance and altitude position of each aircraft, the said display giving as well information relating to the call signal and azimuth of the said aircraft.

The advantages of the sweeping by indicated levels concerning the automatic search of the collision dangers are afforded in the same manner by alternate sweeping by indicated sectors and levels. This alternate sweeping process moreover permits, for aircraft which are not separated in altitude and the flight paths of which pass through the ground station, to immediately verify if they are separated by the required minimum interval (10 minutes flight) over the same airway and if, their ground station flight over moments being suitably separated (at least 10 minutes), their azimuths differ by the imposed minimum (for instance 15°).

VOLUMETRIC INDICATED LEVEL SWEEPING

It is possible to provide a ground station with the information of three coordinates, distance, azimuth and altitude of an aircraft by the reception of a single response signal by submitting the radiation of such a signal, if it results from an altitude and distance sweeping such as that of the omnidirectional altitude radar, to the presence of the aircraft in the sector indicated by a signal $S\theta$ or $S\theta r$, and, if it results from an azimuth and distance sweeping such as that of the VORDAR, to the presence of the aircraft in a slice of altitude $h$ and thickness $\Delta h$ indicated by a signal $Sh$ or $Shr$. In both cases which are easily deduced one from the other, only the second being described hereinafter, the signal for the indication or repetition of the sectors or levels are not used for the distance measurement but only for yielding a discontinued sweeping for the establishment of selective coded communications.

It is known that the distance channel of a VORDAR is constituted by an additional modulation of frequency $f_2=nf_1+\epsilon$ applied to the transmission from a VOR radio beacon.

The frequency $f_1$ of the usual VOR signals being equal to 30 c.p.s., the frequency $f_2$ is chosen in such a manner that radius vectors be rotated of an angle difference being equal to the phase difference of azimuth measuring frequency $f_1$ signals and distance measuring frequency $f_2$ signals, i.e. 7.5° from one revolution to the following of the directional or cardioid pattern. With $$n=\frac{360}{22.5}=16 \text{ and } \xi=\frac{f_1}{3}$$

this result is obtained, i.e. $f_2=490$ c.p.s.

A complete cycle of azimuth and distance sweeping by a 7.5° angle beam is thus accomplished during three cardioid revolutions, i.e. 1/10 second. As it is known that the distance measuring channel is constituted by a frequency $f_2$ sinusoidal signal, from which mobile stations obtain pulses, or by pulse signals of the same recurrence frequency and characteristic coding, the mobile stations have means for comparing these pulses or signals with pulses of suitable duration, deduced from VOR frequency $f_1$ signals, and for providing a response signal when they are in coincidence. For converting such a sweeping into a volumetric sweeping, the transmission from an aircraft of a response signal is subordinated to its presence in an altitude slice indicated by a signal S*h* (or S*hr*) transmitted by the ground station under the same conditions as for the indicated level sweeping. In each indicated level aircrafts are processed according to the order of their azimuth.

The coded information cycle allotted to each aircraft during an interval of time equal to three cardioid revolution time which is required for an azimuth complete sweeping for each indicated level, there is no waste of time in the azimuth sweeping and for 80 slices of 150 meters with an overlapping of 50%, a volumetric sweeping cycle comprising 160 indicated levels lasts 160×1/10 seconds plus 2/10 second for each processed aircraft, i.e. for 50 aircrafts a maximum of 26 seconds.

The association of a distance-altitude cathode display with the VORDAR azimuth-distance display is of a very easy operation as the representative spots of the the same aircraft simultaneously appear on the two screens.

The detailed description of two particular embodiments of the present invention is given hereinafter in connection with the attached drawings, in which.

Figure 1:
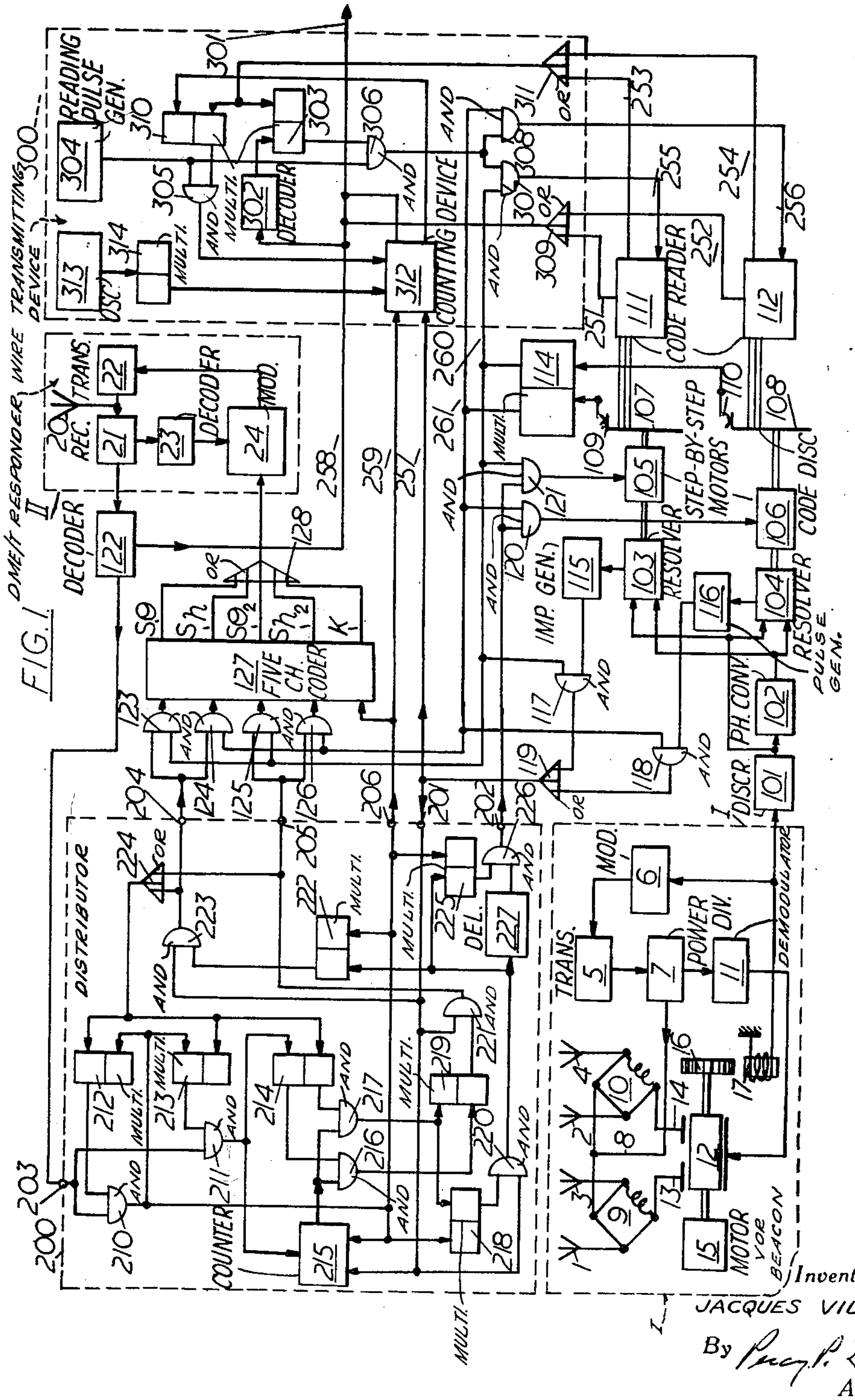
FIGURE 1 represents a block diagram of the equipment of a ground station according to the invention utilizing alternate indicated sectors-and-levels sweepings.

Referring to FIGURE 1, inside dotted lines frames I and II, there are shown conventional equipments of a VORTAC radionavigation system, i.e. a VOR radio beacon (frame I) and a DME/T responder (frame II). The VOR radio beacon comprises as known four antennas 1, 2, 3, 4, supplied on the one hand in phase by a very high frequency carrier wave modulated by a subcarrier wave at the frequency $F=9{,}960$ c.p.s., which is itself modulated by a signal at the fresuency $f_1=30$ c.p.s., on the other hand, with appropriate respective phases, by the same non-modulated carrier wave. The very high frequency energy is yielded by the transmitter 5 modulated by the modulator 6. The output of transmitter 5 is connected to the power divider 7 having two outputs. The first output is connected to the line 8 which supplied in phase to the antennae through the balanced bridge arms 9 and 10, the reference wave doubly modulated at the frequencies F and $f_1$. The second output is connected to the demodulator 11 the purpose of which is the elimination of any modulation and the restoring of the pure carrier wave, then to the capacitive goniometer 12 from which proceed the feeders 13 and 14 which supply the antennae 1–3 and 2–4 through the bridge arms 9 and 10 introducing appropriate fixed phase differences. The capacitive goniometer 12 is driven into rotation at the angular rate of $f_1$ rotations per second by means of motor 15 which also drives the phonic wheel 16 inducing in the pick up coil 17 an alternating current at the frequency F frequency-modulated at the frequency $f_1$. This current applied to the modulator 6 amplitude-modulates the wave generated by the transmitter 5. As also known, the DME/T responder shown in frame II, comprises the antenna 20 connected on the one hand to receiver 21 and on the other hand to transmitter 22. Receiver 21 is connected to decoder 23 which discriminates the interrogation coded signals from mobile stations and applies them to modulator 24 controlling transmitter 22 which transmits coded response signals by means of antenna 20. Modulator 24 can also receive particular coding control signals the yielding of which will be described hereinafter.

According to the invention, the alternating current output of VOR coil 17 is applied to discriminator 101 which provides the sinusoidal signal at frequency $f_1$ yielded by the rotation of phonic wheel 16 actuated by motor 15, i.e. the reference signal of the VOR. This signal is applied, on the one hand directly and on the other hand by means of $$\frac{\pi}{2}$$

phase converter 102, in parallel to two resolvers 103 and 104 the armatures of which are respectively positioned by means of step-by-step motors 105 and 106. The angular position of the armatures of resolver 103 and consequently the phase differnce which is applied thereby to the reference signal of the VOR are picked up by the reader 111 on the binary coding disc 107 wedged on the shaft of motor 105 and moreover bearing a special mark 109 in order to supply a pulse for each complete rotation of disc 107. In the same manner and independently, the phase difference of the same reference signal of frequency $f_1$ due to resolver 104 is picked up by reader 112 on the binary coding disc 108 wedged on the shaft of motor 106 and moreover bearing the complete rotation mark 110.

The readers 111 and 112 which may have photocell mechanical contacts or which may be of any other type suitable for the binary coding discs used, are connected by connections 251–256 to a wire transmitting device 300 which will be described hereinafter.

The signals of frequency $f_1$ phase shifted by the resolver 103 of an angle determined by the position of motor 105 are applied to impulse generator 115 which supplies to AND gate 117 a pulse I$f_1$ each time the sinusoid representing the signal received passes through zero by increasing values. Resolver 104 transmits in the same manner the signals of frequency $f_1$ after a phase difference determined by the position of motor 106, to impulse generator 116 which supplied to AND gate 118 a pulse I$f_1$ each time the sinusoid representing the signal received passes through zero by increasing values. Pulses I$f_1$ provided by impulse generator 115 and used to initiate the transmission of azimuth S$\theta$, S$\theta r$ indication or repetition signals, and pulses I$f_1$ provided by impulse generator 116 to initiate the transmission of altitude S*h*, S*hr* indication or repetition signals as it will be seen hereinafter, the first will be called I$f_1\theta$ and the second I$f_1h$ when there is needed to discriminate them.

The AND gates 117 and 118 are always in opposed conditions under the dependency of bistable circuit 114 positioned by the alternate pulses from complete rotation marks 109 and 110 of discs 107 and 108 respectively.

When a pulse from mark 109 is applied to bistable circuit 114, this circuit is placed in the position which controls an indicated level sweeping cycle. Bistable circuit 114 unblocks gate 118 which transmits, by means of OR gate 119 pulses $If_1h$ from generator 116 to input 201 of distributor 200, signals to be sent to aircraft, which distributor moreover controls the step-by-step advance of indicated level motor 106, as particularly explained further, by means of AND gate 120 also under the dependency of bistable circuit 114. When step-by-step motor 106 has made a complete revolution, a pulse is applied by mark 110 of disc 108 to bistable circuit 114 and places it in the control position of an indicated sector sweeping cycle. In this position, bistable circuit 114 blocks gate 118 and unblocks gate 117. Impulses $If_1\theta$ from generator 115 are then transmitted by means of gate 119, on the one hand through connection 257 to device 300, and on the other hand to input 201 of distributor 200. The step-by-step advance pulses from terminal 202 of distributor 200 are then applied to motor 105 through AND gate 121 unblocked by the bistable circuit 114 passing in the indicated sector sweeping position which simultaneously causes the blocking of gate 120. After a complete step-by-step revolution of indicated sector motor 105, pulse from mark 109 resets the bistable circuit 114 in the indicated level sweeping position, and this more particularly causes the unblocking of gates 118, 120 and the blocking of gates 117, 121. Three other groups of two AND gates, also under the dependency of bistable circuit 114, two groups of which at outputs of distributor 200 and one group in the device 300, will appear in the following description. Pulses $If_1$ applied by gate 119 to the input 201 of distributor 200 essentially cause the transmission by DME/T transmitter 22 of sector or level indication signals $S\theta$ or $Sh$ and repetition signals $S\theta r$ or $Shr$ as well as proceed-to-code signals K depending upon aircraft response signals R received by the receiver 21 and routed under the form of pulses I by decoder 122 towards input terminal 203 of distributor 200.

As already mentioned and as it will be explained in connection with FIGURE 2, the aircraft equipments are able to transmit through their DME transmitter, in addition to the known interrogation signals, coded response pulse signals R, on the one hand to the indicated sector or level signals $S\theta$ or $Sh$ when they are in the indicated sector or level slice, and on the other hand to the sector or level repetition signals $S\theta r$ or $Shr$ if moreover they have not had their transmission turn since the last signal $S\theta$ or $Sh$, i.e., if, having responded to a signal $S\theta$ or $Sh$, they have not received a proceed-to-code signal K.

Decoder 122 transmits to terminal 203 of distributor 200, an impulse I for each response R to a signal $S\theta$, $Sh$, $S\theta r$ or $Shr$ received by DME/T receiver 21 and moreover it transmits to device 300 through connection 258, coded messages transmitted by the aircraft upon reception of signal K.

Input 201 of distributor 200 is connected in parallel to a counting input of counter 215 and to three AND gates 220, 221 and 223. Counter 215 has two other inputs, the initiating input and the capacity increasing input, and one output through which it provides a pulse either according to the second or the third pulse $If_1$ received by its counting input after reception of a pulse through its initiating input pulse according as it does not receive or receives at least one pulse at its capacity increasing input between the initiating pulse and the following first pulse $If_1$. Gate 223 is under the control of bistable circuit 222 which holds it unblocked when reset. The output of gate 223 is connected on the one hand to OR gate 224 controlling the resetting of three bistable circuits 212, 213, 214 and on the other hand to output terminal 204.

Input terminal 203 is connected to two AND gates 210 and 211, the first being unblocked and the second blocked when bistable circuits 212 and 213 are reset. The output of gate 210 is connected to:

Set inputs of bistable circuits 212 and 213 which in this position block gate 210 and unblock gate 211, Initiating input of counter 215, Set input of bistable circuit 218 which, in this position, blocks gate 220, Set input of bistable circuit 225 which, in this position, blocks AND gate 226, Set input of bistable circuit 222 which, in this position, blocks gate 223, Output terminal 206.

Gate 211 output is connected to the set input of bistable circuit 214 which, in this condition, blocks AND gate 217 and unblocks AND gate 216. These two gates receive in parallel pulses appearing at the output of counter 215. Gate 216 output is connected to the set input of bistable circuit 219 which, in this condition, unblocks gate 221 the output of which is connected, on the one hand, to OR gate 224 and, on the other hand, to output terminal 205. Gate 217 output is connected, on the one hand, to the reset input of bistable circuit 219 which, in this condition, blocks gate 221 and, on the other hand, to the reset input of bistable circuit 218 which, in this condition, unblocks gate 220. Gate 220 output is connected to:

Reset input of bistable circuit 222,

Reset input of bistable circuit 225 which, in this condition, unblocks gate 226 the output of which is connected to terminal 202, Delay line 227 transmitting with a two millisecond delay, pulses which are applied to it, to gate 226.

The resetting up of bistable circuits 218, 219 and 222 is delayed by the duration of pulses $If_1$.

The output terminal 202 connected to gate 226 output as stated, controls the step-by-step advance of either motor 105 through gate 121 when bistable circuit 114 is in the indicated sector sweeping position, or motor 106 when bistable circuit 114 is in the indicated level sweeping position.

The output terminal 204 is connected to two AND gates 123 and 124 placed under the control of bistable circuit 114. Outputs of gates 123 and 124 are respectively connected to a first and second inputs of five channel coder 127 which converts pulses applied to each one of its five inputs into pulse pairs characteristic of the concerned input and transmits through OR gate 128 coded signals thus produced to DME/T modulator 24 causing their transmission by means of transmitter 22. During the indicated sector sweeping cycles, pulses from terminal 204 are transmitted through gate 123 and give rise to signals $S\theta$; during the indicated level sweeping cycles pulses are transmitted through gate 124 and give rise to signals $Sh$.

The output terminal 205 is connected in the same manner to two AND gates 125 and 126 also under the dependency of bistable circuit 114 and the impulses generated thereby are, during the indicated sector sweeping cycles, applied through gate 125 to a third input of coder 127 to give rise to signals $S\theta r$ and during the indicated level sweeping cycles, applied through gate 126 to a fourth input of coder 127 to give rise to signals $Shr$.

The output terminal 206 is connected in parallel to a fifth input of coder 127 and via connection 259 to device 300. The occurrence of a pulse to terminal 206 causes the transmission of a proceed-to-code signal K.

The operation of distributor 200 is as follows:

The initial situation chosen from the understanding of the following statement is that where, during an indicated level sweeping cycle; for instance, i.e. the bistable circuit 114 being in the condition which secures the unblocking of gates 118, 120, 124, 126 and the blocking of gates 117, 121, 123, 125, pulse $If_1h$ when applied to terminal 201 and finding gate 221 closed because bistable circuit 219 is in reset condition and gate 223 open because bistable circuit 222 is in reset condition, restores in reset conditions gates 212, 213, 214 and then appearing at terminal 204 causes, through the open gate 124, the transmission of indicated level signal $Sh$. This involving, as it will be seen further, that gate 220 be open and therefore gates 218 and 225 in reset condition, all the bistable circuits of distributor 200 are thus in reset condition.

Three cases are then to be considered according as zero, one or several response signals to signal $Sh$ are received by DME/T receiver 21, causing zero, one or several pulses I applied through decoder 122 to terminal 203.

*(a) No response to signal Sh*

No pulse is applied to terminal 203. After two millisecond delay in circuit 227, pulse $If_1h$ which has caused signal $Sh$ is transmitted through the open gate 226 to terminal 202 and through gate 120 also open to indicated level motor 106 which advances of one step or otherwise stated rotates by 2.25°. At the next period of VOR signal of frequency $f_1$ a new pulse $If_1h$ generated by pulse generator 116 is applied through gates 118 and 119 to terminal 201 and a level shifted by $$\frac{\nabla h}{2}=75$$

meters with respect to the preceding level, is designated by a further signal $Sh$.

*(b) One response signal R to signal Sh*

The transmission of a response signal by an aircraft positioned less than three hundred kilometers from the ground station causes the application of pulses $I_1$ to terminal 203 less than 2 milliseconds after the transmission of signal $Sh$ i.e. practically after the application to terminal 201 of pulse $If_1h$ which initiated this transmission. Pulse $I_1$ passes through the open gate 210, sets bistable circuits 212 and 213, initiates counter 215, sets bistable circuit 218 thus blocking gate 220, sets bistable circuit 225 thus blocking gate 226, sets bistable circuit 222 thus blocking gate 223, and causes through terminal 206 and coder 127 the transmission through DME/T of proceed-to-code signal K. Gate 226 being blocked no step advance is ordered.

At the following cycle of the reference signal when a further pulse $If_1h$ is applied to 201, said pulse is blocked by the closing of gates 220, 221, 223 and besides by counter 215. The second pulse $If_1h$ after that which has given rise to a response signal is also blocked by gates 220, 221, 223, but is transmitted by counter 215 to AND gates 216 and 217. Gate 216 is closed and gate 217 open, bistable circuit 214 being reset. The pulse coming from gate 217 confirms the reset position of bistable circuit 219 and restores in reset position bistable circuit 218 which unblocks gate 220 with a delay equal to the duration of pulses $If_1$. The third pulse $If_1h$ after that which has given rise to a response signal is also blocked by closed gates 221 and 223, but passes through the open gate 220, restores bistable circuit 225 in reset position, thus unblocking gate 226, and restores bistable circuit 222 in reset position, which unblocks gate 223 with a delay equal to the duration of pulses $If_1$; after a two millisecond delay in the circuit 227 the said pulse passes gate 226, appears to terminal 202 and passes gate 120 in order to advance of one step motor 106. The following pulse $Ifh$ causes the transmission of a signal $Sh$ under the initial conditions.

*(c) Several response signals to signal Sh*

If several aircraft are in the range of the ground station and in the indicated altitude slice, their responses R to a determined signal $Sh$ arrive to DME/T receiver 21 in an interval of time less than 2 milliseconds and in the order of increasing distances from aircrafts to ground station. Pulses applied by the decoder 122 to terminal 203, numbered in their arrival order are thus $I_1, I_2 \ldots I_n$.

Pulse $I_1$ yields the same effects as when there is only one response signal. Pulse $I_2$ finds gate 210 closed and gate 211 open. Passing through this gate, the said pulse sets bistable circuit 214 which blocks gate 217 and unblocks gate 216. Besides, applied to counter 215, it increases by one unit its counting capacity so that it blocks two successive pulses $If_1h$ and transmits only the third pulse. If there are more than two aircraft and if consequently one or several pulses $I_3 \ldots I_n$ appears after pulse $I_2$ they pass also through gate 211 but they only confirm the position of the bistable circuits positioned by pulse $I_2$ and are therefore without effect.

It results from pulse $I_2$ that, after blocking of two successive pulses $If_1h$, when counter 215 let pass the third pulse, this pulse passes gate 216 and controls the set of bistable circuit 219 which is operating after a delay equal to the duration of pulses $If_1$. The following pulse $If_1h$ passes gate 221 thus unblocked, and on the one hand is applied to OR gate 224 by means of which it restores in reset position bistable circuits 212, 213 and 214, and on the other hand to terminal 205 and through the open gate 126 to coder 127 causing the transmission of a level signal $Shr$ repetition without any step advance control of motor 106, gate 220 being left closed. The aircrafts having had their transmission turn since the last signal $Sh$ not responding to signals $Shr$, the indexes of pulses I derived from response signals R of aircrafts are reduced by one unit and the same indicated level is repeated until the most distant aircraft has had its transmission turn. The initial situation is then found again.

When motor 106 has thus made step-by-step a complete revolution since the start of indicated level cycle, a pulse is transmitted by mark 110 to bistable circuit 114 and an indicated sector sweeping cycle proceeds in a similar manner.

Remote transmission of information thus picked up by a ground station on aircraft moving in its control space is effected by means of device 300. This device, assigned for transmitting by low pass-band wire channel the call signal, coded information, azimuth, flight level and aircraft distance, comprises:

Telephone line 301 directly linked to connection 258 from decoder 122, Decoder 302 for air-ground end message signal, the input of which is also linked to connection 258 and the output of which controls the setting of bistable circuit 303, 750 baud reading pulse generator 304 having its output connected in parallel to two AND gates 305 and 306, Two AND gates 307 and 308 under the control of bistable circuit 114 through connections 260 and 261, transmitting the reading pulses received from gate 306 either by reading device 111 through connection 255, or by reading device 112 through connection 256 according to the position of bistable circuit 114, OR gate 309 transmitting to line 301 reading signals from reading device 111 and 112 through connections 251 and 252, Bistable circuit 310 the set input of which is connected in parallel with the reset input of bistable circuit 303 to OR gate 311 transmitting end-reading signals received through connections 253 and 254 of reading devices 111 and 112, Counting device 312 which is operating as follows:

(a) Operation is triggered by each gate 119 output pulse $IF_1$ through connection 257 and stopped either when counter is receiving a pulse from terminal 206 through connection 259, or when counter is automatically reset after two milliseconds.

(b) Reading is controlled by 750 baud pulses generated by generator 304 and reaching the counter through gate 305 when bistable circuit 310 is set; the reading signal appearing to the first output of counter 312 is applied to line 301 and the end reading signal appearing to a second output of counter 312 is applied to the reset input of bistable circuit 310, 200 kc.p.s. oscillator 313 controlling bistable circuit 314 which supplies to counter 312 counting pulses at the recurrence frequency of 100 kc.p.s., i.e. every ten microseconds.

The operation of device 300 is easily understood from its structure.

Each time a signal $S\theta$, $S\theta r$, $Sh$ or $Shr$ is transmitted by DME/T counter 312 is started by pulse $If_1$ which was generating the said signal. If there is no aircraft response signal, counter 312 is automatically stopped at zero after two milliseconds. If there is one or several responses R, counter 312 is stopped by a pulse initiated by the first received response signal, in the same interval of time as a proceed-to-code signal K is transmitted to the aircraft which has transmitted this response signal. Counter 312 records in millisecond hundredths the duration of the radio-path there and back between DME/T and the said aircraft, i.e. the product by 1.5 of its kilometer distance. The coded message transmitted at 750 bauds by the aircraft upon the reception of signal K and comprising its call signal followed and ended by an air-ground end-of-message characteristic signal is directly routed on telephone line 301. The air-ground end-of-message signal decoded by decoder 302 provides a set pulse to bistable circuit 303 and therefore causes the unblocking of gate 306. The reading pulses generated by generator 304 are applied through gate 306 to two gates 307 and 308 and transmitted either to reading device 111 or to reading device 112 according as an indicated sector sweeping cycle or an indicated level sweeping cycle is proceeding. The indicated sector or level reading 750 baud signal is transmitted via connections 251, 252 and through gate 309 to wire channel 301 and the indicated sector or level-end-of-reading signal is transmitted via one of the connections 253, 254 and through gate 311 in parallel at the reset input of bistable circuit 303 and at the set input of bistable circuit 310. Gate 305 being thus unblocked, the reading pulses generated by generator 304 are applied to counter 312. The reading signal of the number recorded in counter 312 and which represents the distance of the concerned aircraft is routed by wire 301 and the distance end-of-reading signal is applied to the reset input of bistable circuit 310. Device 300 is restored to its initial condition until a further starting pulse for counter 312 is transmitted to it via connection 257.

Figure 2:
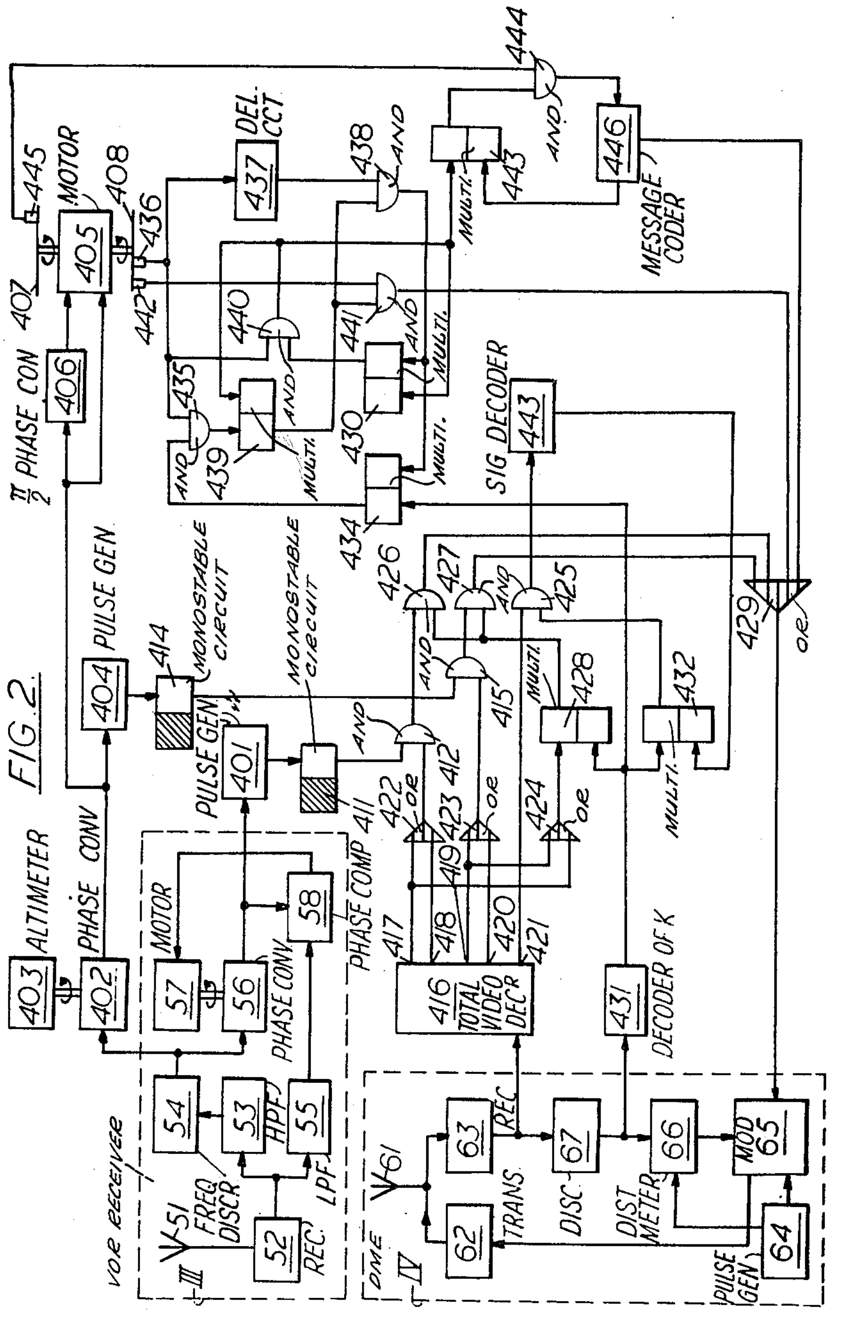
FIGURE 2 represents a block diagram of the equipment of the mobile stations corresponding to the ground equipment of FIGURE 1.

FIGURE 2 represents the equipment on board the aircraft according to the invention, in relation with the ground equipment shown in FIGURE 1. On FIGURE 2, inside frames III and IV, there are shown conventional board equipments of the VORTAC radio-navigation system, i.e., a VOR receiver (frame III) and a DME distance measuring equipment (frame IV). As known, the VOR receiver III has to provide to the mobile station in which it is mounted, the azimuth of said mobile with respect to a VOR radio beacon. This receiver comprises antenna 51, a radio-receiver 52 connected on the one hand to band filter 53 having a central frequency equal to F, followed by a frequency discriminator 54 giving the reference signal of frequency $f_1$ and, on the other hand to low-pass filter 55 giving the measuring signal of frequency $f_1$ generated by the cardioid pattern rotation of the radio beacon. The reference signal from frequency discriminator 54 is applied to phase converter 56 driven by motor 57 then, after phase-shifting, to an input of phase comparator 58 which receives through a second input the azimuth measuring signal from filter 55. The error signal produced by the phase comparator 58 is applied to motor 57 in the suitable direction in order to put the signal of frequency $f_1$ from phase converter 56 in phase concordance with the measuring signal.

As also well known, the DME IV distance measuring equipment comprises antenna 61 connected to transmitter 62 and receiver 63. Pulse generator 64 actuates modulator 65 for sending, by means of transmitter 62, interrogation signals and simultaneously applies triggering pulses ot distance-meter 66. The response signals of the DME/T ground responder radio beacon are discriminated by discriminator 67 connected to an output of receiver 63 and applied to distance-meter 66. Discriminator 67 is a tracking device which, after a search period, permanently positions a gate which, in the so-called "total-video" group of frequency video output signals from receiver 63 allow passage of signals only separated by a constant time interval from the transmission of transmitter 62.

Each mobile station transmitting interrogation signals with systematically irregular intervals, the signals which pass through this gate, form what is called the "filtered video" and may be considered by each aircraft as responding to its proper signals.

According to the patent application Ser. No. 3,171/60, filed Jan. 18, 1960, already mentioned, the output of phase converter 56 of VOR III receiver is connected to the input of pulse generator 401 which generates a short pulse each time the sinusoid representing the signal of frequency $f_1$ which is applied to the said generator passes through zero by increasing values.

According to the U.S. patent application Serial No. 93,698, filed March 6, 1961 also mentioned above, the reference signal of frequency $f_1$ generated by discriminator 54 is simultaneously applied to phase converter 56 and to phase converter 402 driven by altimeter 403 so that it performs a rotation proportional to altitude changing, i.e. 3° for 100 meters level difference, 4.5° for 150 meters and 360° for 12,000 meters. The output of phase converter 402 is connected to pulse generator 404 similar to pulse generator 401.

According to the present invention, the output of phase converter 402 is connected at the same time to the pulse generator 404, directly on the one hand, and by means of $$\frac{\pi}{2}$$

phase converter 406 on the other hand to the inductor coils of motor 405 the armature of which drives, with $f_1=30$ revolutions per second, on the one hand a disc 407 bearing 25 equidistant marks and consequently able to provide pulses at 750 bauds, and on the other hand a disc 408 bearing on a first track, in binary code and with the same spacing the call signal of the mobile station and on a second track a call signal start mark. The output of pulse generator 401 is connected to the input of monostable circuit 411 converting short pulses received into pulse $i\theta$ of duration $$\Delta t(\theta)=\frac{1}{f_1}\times\frac{15°}{360°}=\frac{1}{720}$$

second, equivalent to those which would be yielded at the output of radio receiver 52 if antenna 51 was swept by a 15° wide beam at the same rate $f_1$ as the cardioid pattern. Pulses $i\theta$ unblock AND gate 412 connected to the output of monostable circuit 411. Short pulses provided by pulse generators 404 are also converted by monostable circuit 414 into pulses $ih$ of duration.

$$\Delta t(h)\frac{1}{f_1}\cdot\frac{150^{m}}{12000^{m}}=\frac{1}{30}\,\frac{4.5°}{360°}=\frac{1}{2400}$$

second which unblocks AND gate 415. The output of DME IV receiver 63 is connected to the input of so-called total video decoder 416 which discriminates, according to their coding, the signals received from the ground station, routes pulse pairs obtained from signals $S\theta$ via first output 417, signals $S\theta r$ via second output 418, signals $sh$ via third output 419, signals $Shr$ via fourth output 420 and transmits pulses forming the coded messages and also a pulse from the "ground-air end-of-message" coded signal via fifth output 421. The output terminal 417 is connected in parallel to two OR gates 422 and 424. Terminal 418 is connected to gate 422. Terminal 419 is connected in parallel to two OR gates 423 and 424. Terminal 420 is connected to 423 and terminal 421 is connected to AND gate 425. The output of OR gate 424 is connected to the set input of bistable circuit 428 which in this condition unblocks two AND gates 426 and 427. The output of OR gate 422 is connected to gate 412 the output of which is connected to gate 426, and the output of gate 423 is connected to gate 415 the output of which is connected to gate 427. The outputs of gates 426 and 427 are connected to OR gate 429 the output of which is connected to an input controlling modulator 65 of DME/IV.

At the output of filtered video discriminator 67 and in parallel with distance meter 66, is connected decoder 431 of proceed-to-code signal K. The output of decoder 431 is connected in parallel to:

The reset input of bistable circuit 428 which, in this condition, blocks gates 426 and 427;

The set input of bistable circuit 432 which, in this condition, unblocks gate 425 the output of which is connected to decoder 433 of a known type which translates in clear the coded messages coming from the ground station and on the other hand obtains from the air-ground end-of-mesage signal a reset pulse of bistable circuit 432 thus blocking gate 425;

The set input of bistable circuit 434 which, in this condition, unblocks AND gate 435.

Reading head 436, which may be for instance a photo-electric cell and which is placed in front of the track of disc 408 bearing a sole call signal start mark, is connected to gate 435, AND gate 440 and, through delay circuit 437 causing a delay equal to the reading pulse duration of reading head 436, to gate 438. The output of gate 435 is connected to the set input of bistable circuit 439 which, in this condition, unblocks gate 438 and also AND gate 441. The second input of gate 441 is connected to reading head 442 placed in front of the track on which the coded call signal of the mobile station is recorded. The output of gate 441 is connected to OR gate 429. The output of gate 438 is connected to:

The reset input of bistable circuit 434 which, in this condition, blocks gate 435, The set input of bistable circuit 430 which, in this condition, unblocks gate 440.

The output of gate 440 is connected to:

The reset input of bistable circuit 439 which, in this condition, blocks gates 438 and 441, The reset input of gate 430 which, in this condition, blocks gate 440, The set input of bistable circuit 443 which, in this condition, unblocks AND gate 444 receiving from reading head 445 750 bauds pulses yielded by the rotation of disc 407. The output of gate 444 is connected to coder 446 positioned by hand according to a binary code so that its reading by pulses which are applied to it causes the transmission of predetermined coded messages. The output of coder 446 is connected to OR gate 429. Moreover, the air-ground end-of-message signal which ends this transmission causes the transmission by coder 446 of a reset pulse of bistable circuit 443 thus causing the unblocking of gate 444.

The operation of this equipment is as follows:

An aircraft transmitting, as known, through DME transmitter 62, interrogation signals at irregular time intervals, the gate of its filtered video discriminator 67 is permanently positioned depending upon its distance to the DME/T ground beacon.

On the other hand, the unblocking of gate 412 by means of bistable circuit 411 occurring, as stated before, at each period of the signal of frequency $f_1$ from an instant determined by the aircraft azimuth seen from the radio beacon and for a duration $\Delta t(\theta)$, the sole aircraft which receives a signal $S\theta$ or $S\theta r$ when their gate 412 is open are those which are positioned between the radio beacon azimuths $\theta-\Delta\theta$ and $\theta$. One signal $S\theta$ arising under these conditions causes the flip flop of bistable circuit 428 or its set confirmation unblocking gate 426, also gate 427 and the transmission of a response signal R. Practically the signal R may advantageously be the repetition of signal $S\theta$.

The ground station responding to signal R by a proceed-to-code signal K, this appears in the filtered video of the aircraft transmitting signal R; decoder 431 resets bistable circuit 428 which thus blocks gates 426, 427, and sets on the one hand bistable circuit 432 which unblocks gate 425, and on the other hand bistable circuit 434 which unblocks gate 435. As soon as the call signal start mark of disc 408 permanently rotating at 30 revolutions per second passes in front of reading head 436, this latter transmits a pulse which cannot pass through closed gate 440 and which is applied on the one hand through gate 435 to bistable circuit 439 unblocking thus gates 441 and 438 and on the other hand with a delay equal to its duration, via circuit 437 to gate 438. Pulses forming the coded call signal recorded on disc 408 are therefore transmitted by reading head 442 to gate 441 and through this one to gate 429 and modulator 65 to cause the transmission of the corresponding signal.

However the pulse delayed by circuit 437 being applied through gate 438 to bistable circuits 434 and 430, the first one blocks gate 435 and the second one unblocks gate 440. After a complete rotation of disc 408 the passage of call signal start mark in front of reading head 436 causes the transmission by said head of a pulse which cannot pass through the closed gate 435 and which, passing through open gate 440 resets bistable circuits 439 and 430 and sets bistable circuit 443. The resetting of bistable circuit 439 blocks 441 and 438 before the pulse delayed by circuit 437 reaches gate 438. At the same time the blocking of gate 441 ends the transmission of pulses read by reading head 442 on disc 408, the opening of gate 444 consecutive to the setting of bistable circuit 443 secures the routing of reading pulses at 750 bauds supplied by the rotation of disc 407 in front of reading head 445 towards coder 446. The coded message, coder preparation of which is manually positioned, is transmitted following the call signal. The characteristic air-ground end-of-message signal resets bistable circuit 443 and blocks gate 444. When the call signal start mark passes again in front of reading head 436, the pulses supplied by this latter have no effect, due to gates 435, 440 and 438 blocked.

By the operation of phase converter 402, generator 404, bistable circuit 414 and gate 415, signals $Sh$ are processed as signals $S\theta$ with the exception that motor 405 rotating in phase with the signal of frequency $f_1$ phase shifted according to the aircraft altitude, the displacement of the call signal mark in front of reading head 436 is synchronous with the reception of proceed-to-code signals K. Thus, there is no time lost during the indicated level sweeping cycles.

The transmission of a response signal to signal $S\theta r$ and $Shr$ is conditioned by the condition of bistable circuit 428. This latter being set unblocks gates 427 and 428 by any signal $S\theta$ or $Sh$ and, in blocking condition, by the reception of a proceed-to-code signal K, any craft which has not yet received signal K in its filtered video since the last signal $S\theta$ or $Sh$, responds to signals $S\theta r$ and $Shr$ as well as to signals $S\theta$ and $Sh$, but no response signal can be supplied to a repetition signal $S\theta r$ or $Shr$ by an aircraft having already had its transmission turn. The ground station transmitting, upon reception of an air-ground end-of-message signal, and for the aircraft which is just transmitting this signal, a coded message, this message which is received by every aircraft in its total video is decoded only by the addressee aircraft which is the sole to have its gate 425 open following the preceding signal K. The ground-air end-of-message signal results in resetting bistable circuit 432 and blocking again gate 425.

Figure 3:
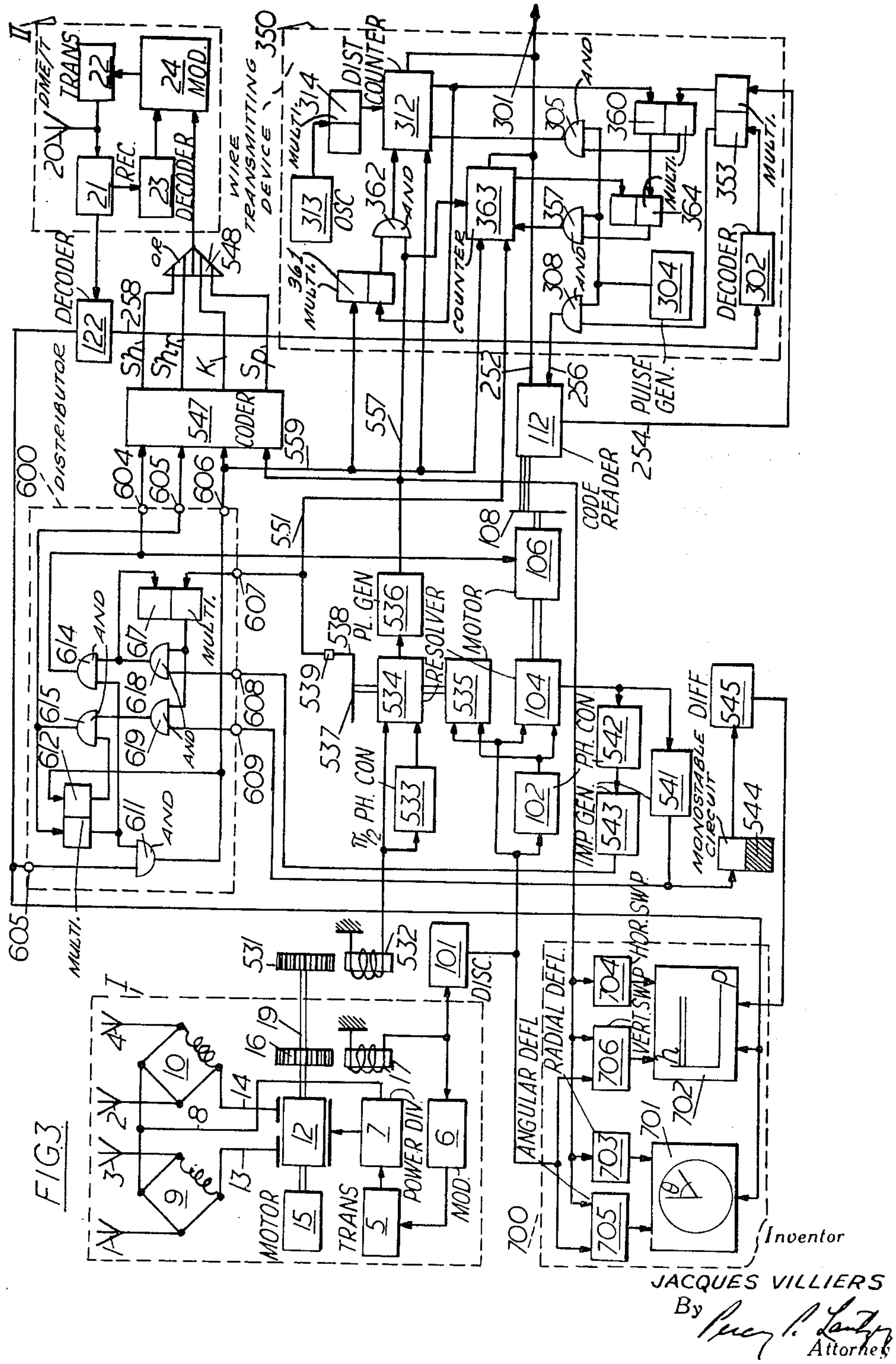
FIGURE 3 represents a block diagram of the ground station equipment according to the invention, utilizing volumetric indicated level sweeping.

The ground equipment needed for the application of the invention to an indicated level volumetric sweeping is represented on FIGURE 3. This equipment is different from the equipment of FIGURE 1 by the suppression of elements relating to the indication or reptition of sectors, the adjunction of a distance channel of frequency $f_2$=490 c.p.s. and also a cathode screen display, a great simplification of signal distribution as the time needed for an azimuth complete sweeping for each indicated level is equal to the time allotted to the intercommunication with each aircraft. Elements of FIG. 1 which remain without modification in FIG. 3 have the same reference designations and will be considered as known. The frequency $f_2$=490 c.p.s. is obtained, according to an arrangement already described in U.S. patents application filed on March 1st, 1961, Serial No. 92,512, in wedging a toothed wheel 531 comprising 16 teeth on shaft 19 of the VOR radion beacon thus generating in coil 532 |—| a 480 c.p.s. signal which is applied on the one hand directly, and on the other hand by means of $$\frac{\pi}{2}$$

phase converter 533 to the inductor coils of resolver 534 the armature of which is driven by motor 535 rotating at 10 revolutions per second in the suitable direction. Motor 535 is a three pairs of poles motor which is driven by discriminator 101 and phase converter 102 in parallel with resolver 104. The output of discriminator 101 is moreover connected to cathode display set 700 which will be further described. The 490 c.p.s. signal supplied by resolver 534 is applied to pulse generator 536 which delivers a pulse each time the sinusoid representing these signals passes through zero by increasing values. The pulses into coded signals $S\rho$ applied by means of OR gate Coder 547 similar to coder 127, which transforms said pulses into coded signals $S\rho$ applied by means of OR gate 548 to DME/T II for transmission;

Cathode screen display set 700;

Through connection 557 to wire transmitting device 350 similar to device 300 of FIGURE 1.

The armature of resolver 534 drives disc 537 bearing mark 538 the displacement of which in front of reading head 539 generates a pulse applied on the one hand to input 607 of distributor 600, and on the other hand, through connection 551 to device 350. The signal of frequency $f_1$ generated by resolver 104 is applied to:

On the one hand, impulse generator 541 supplying a pulse each time the received signal passes through zero by increasing values, On the other hand, phase converted 542 applying a fixed phase shift equal to that produced by a step advance of motor 106, i.e. 2.25° upon the reception of signal and transmitting it to impulse generator 543 analogous to generator 541 and connected to input 608 of distributor 600.

The pulses generated by generator 541 are applied to:

On the one hand, a monostable circuit 544 transforming said pulses in duration pulses $$\Delta t(h) = \frac{1}{2400}$$

second which are differentiated by differentiator 545 connected to set 700.

On the other hand, input 690 of distributor 600.

Distributor 600 is constituted in the following manner:

Terminal 607 is connected to the set input of bistable circuit 617 which, in this condition, unblocks two AND gates 618 and 619;

Terminal 608 is connected to the second input of gate 618 the output of which is connected, on the one hand, to AND gate 614 and, on other hand, to the reset input of bistable circuit 617 which, in this condition, blocks gates 618 and 619;

Terminal 609 is connected to a second input of gate 619 the output of which is connected to AND gate 615.

Figure 4:
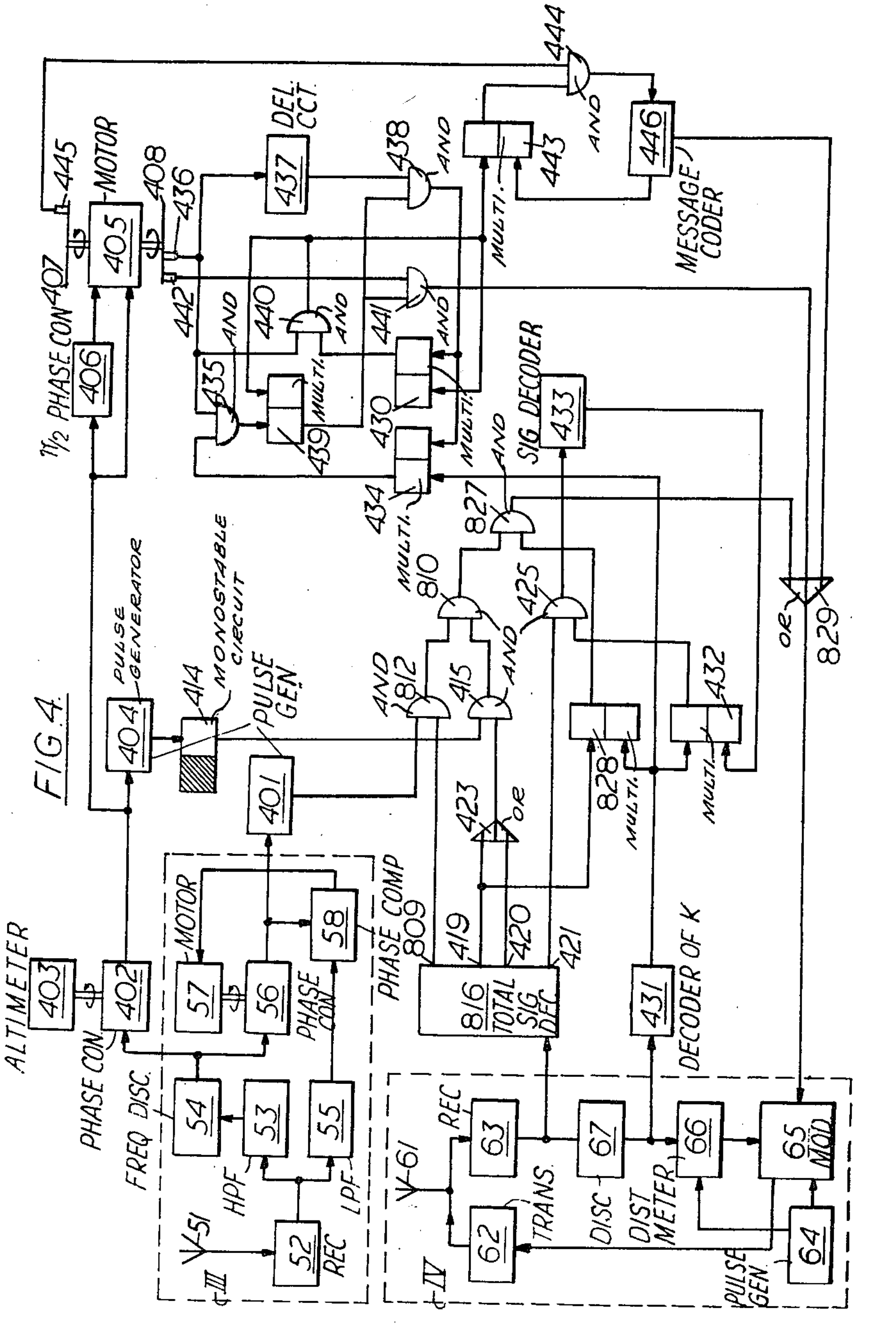
FIGURE 4 represents a block diagram of the mobile station equipment corresponding to the ground equipment of FIGURE 3.

Terminal 603 which receives pulses I yielded by decoder 122 from signals R of aircrafts responsive to signal $S\rho$ as it will be seen in connection with FIGURE 4, is connected to AND gate 611 unblocked when bistable circuit 612 is reset. Output of gate 611 is connected to:

On the one hand, the set input of bistable circuit 612 which, in this condition, blocks gates 611 and 614 and unblocks gates 615, On the other hand, terminal 606.

The output of gate 615 is connected in parallel to terminal 605 and to reset input of bistable circuit 612 which, in this condition, blocks gate 615 and unblocks gates 611 and 614. The output of gate 614 is connected in parallel to the step advance control input of motor 106 and to terminal 604. Terminals 604, 605, 606 are connected to three inputs of coder 547 which transforms the pulses respectively coming from each one of them into signals $Sh$, $Shr$ and K which are transmitted for transmission through OR gate 548 to modulator 24 of DME/T II.

Terminal 606 is also connected through connections 559 to device 350.

Set 700 comprises panoramic display cathode-ray tube 701 the sweeping of which is made by radial deflection by circuit 703 and by angular deflection by two input circuits 705 and type display cathode ray tube 702 in cartesian coordinates $\rho$ and $h$ the horizontal sweeping of which is made by circuit 704 and the vertical sweeping by two input circuits 706. Circuits 705 and 706 have their first input connected to the output of discriminator 101 supplying the VOR reference signal of frequency $f_1$ and their second input connected, and also the input of circuits 703, 704, to the output of generator 536 of recurrence frequency $f_2$ pulses which initiate the transmission of signals $S\rho$.

Angular deflection circuit 705 supplies a frequency $f_1$ sweeping voltage stepped at recurrence frequency $f_2$, as known and more particularly mentioned in the patent application filed March 1, 1961, Serial No. 92,512. Vertical deflection circuit 706 supplies a saw-tooth voltage of recurrent frequency $f_1$ varying by step at the recurrence frequency $f_2$, as known, and more particularly mentioned in the patent application above mentioned (Serial No. 92,512). Moreover, pulses initiated by differentiator 545 make appear horizontal marks for levels $H$ and $H+\Delta\ h$ on screen 702.

Wire channel transmission device 350 is similar to device 300 except regarding protection of the input of distance counter 312 by the bistable circuit 361 controlling AND gate 362, the recording of the azimuth secured by counter 363 analogous to counter 312, and the distribution of reading pulses of generator 304, three coordinates $h$, $\rho$, $\theta$ having to be transmitted for each established communication.

Set input of bistable circuit 361 which, in this condition, blocks gate 362 is connected to connection 559 from terminal 606. Second input of gate 362 is connected to connection 557 from pulse generator 536. The output of gate 362 is connected to starting input of counter 312, counting input of which is connected to bistable circuit 314, stop input to connection 559, reading input to AND gate 305, reading output to wire 301 and output of the end-of-reading signal is connected, on the one hand, to reset input of bistable circuit 360 and, on the other hand, to reset input of bistable circuit 361 which, in this condition, unblocks gate 362. The resetting of bistable circuit 360 causes blocking of gate 305 and the setting of bistable circuit 364 which, in this condition, unblocks AND gate 357 which thus receives from gates 305 and 308 the reading pulses generated by generator 304 and applies them to reading control input of counter 363. Starting input of counter 363 is connected to connection 551, counting input to output of pulse generator 536, stop input to connection 559, reading output to wire 301 and end-of-reading signal output to reset input of bistable circuit 364 which, in this condition, blocks gate 357. Air-ground end-of-message signal decoder 302, input of which is connected to decoder 122 through connection 258 has its output connected to set input of bistable circuit 353 which, in this condition, unblocks gate 308 transmitting reading pulses from generator 304 to reading device 112.

After transmission of the indicated level through connection 252 to wire 301, the azimuth end-of-reading pulse appearing upon connection 254, resets bistable circuit 353 which, in this condition, blocks gate 308 and sets bistable circuit 360 which, in this condition, unblocks gate 305.

The operation of the ground equipment represented in FIGURE 3, is as follows:

By adopting the same initial condition as in the case of FIGURE 1, i.e. the instant in which a signal S$h$ has just been transmitted, there is to be first considered that the transmission occurs during the first period of the reference signal following the unblocking of gates 618, 619 through bistable circuit 617 under the effect of a pulse from reading head 539 and that the transmission time does correspond not to the phase of signal of frequency $f_1$ generated by resolver 104 but at the said phase shifted by the phase converter 542 of 2.25° angle corresponding to one step of motor 106. The pulse which causes the transmission of signal S$h$ passes through gate 618, resets bistable circuit 617 blocking gates 618 and 619, passes through gate 614 which implies bistable circuit 612 in the resetting condition, and controls the step advance of motor 106 which positions resolver 104 in accordance with the indicated level.

Pulses generated by pulse generator 536 causes, by means of coder 547 and gate 548 the transmission of signal S$\rho$ at the recurrence frequency of $f_2$=490 c.p.s. Associated with the rotation of $f_1$=30 revolutions per second of the VOR cardioid radiation pattern, the signals S$\rho$ indicate at the rate of one out of three by cardioid revolution, 48 directions spaced of 7.5°. Otherwise stated, horizon being divided into 48 sectors of 7.5°, and each direction being replaced by a 7.5° angle beam, the 48 sectors will be swept during three cardioid revolutions at the rate of one out of three by revolution. Three cardioid revolutions after its preceding passage in front of reading head 539, mark 538 causes the application of a further set pulse of bistable circuit 617. When pulse generator 541 supplies a pulse the instant of which corresponds to the phase shift applied by resolver 104 to the reference signal, if there is no aircraft response signal since the last signal S$h$, gate 615 is closed and the pulse applied with the additional fixed phase shift of phase converter 542 by pulse generator 543, passes through the open gate 614 causing the transmission of a further signal S$h$ which indicates a level displaced of $$\frac{\Delta h}{2}=75$$

meters with respect to the preceding one. The reception of a response signal R causes the transmission by decoder 122 of a pulse which passes through gate 611, sets bistable circuit 612 and, applied to coder 547, is transformed into a proceed-to-code signal K transmitted by the DME/T II. An information exchange cycle which lasts three cardioid revolutions immediately begins with the aircraft having supplied the response signal R.

The passage of bistable circuit 612 in the setting condition blocks gate 611, preventing the passage of further response pulses, blocks gate 614 and unblocks gate 615. When mark 538 having transmitted to bistable circuit 617 a further set pulse by reading head 539, a pulse is generated by generator 541, which, passes through the open gate 615 whereas the pulse generated by generator 543 is blocked by the closed gate 614 and an indicated level repetition signal S$hr$ upon the preceding transmission is transmitted by the DME/T II, introducing in the sweeping advancement the interruption time needed for a ground-air then air-ground coded information exchange. For all the aircrafts responding to the indicated level, this one is repeated until each one of them has had its transmisson turn. Any response no more reaching then a further level is indcated by a signal S$h$. In the local display on cathode screens, the stepped sweeping adopted are provided for avoiding azimuth or altitude errors which would be introduced by the phase variation of the reference signal of frequency $f_1$ during the radio path there and back from the station to the aircraft.

In the wire channel transmission, two further problems concerning device 300 of FIGURE 1 are keeping of the distance recorded in counter 312 till the moment where it will have been transmitted over wire 301 and recording of the azimuth under a digital form in view of its transmission at 750 bauds. Concerning the distance, it is sufficient to secure the blocking of gate 362 by applying to bistable circuit 361 a response pulse which stops the counter itself and its unblocking by the distance end-of-reading signal from counter 312 output. Concerning the azimuth, there has been stated that the said azimuth is quantized into 48 sectors of 7.5° the sweeping order number of which, from the reference azimuth, North for instance, corresponding to pulses supplied every cardioid three revolutions by reading head 539, may be recorded by a counter counting number of signal S$\rho$ transmitted between the pulse of reading head 539 and the first response signal. Thus, when upon receipt of signal K, an aircraft transmits its call signal followed by other coded information and air-ground end-of-message signal, call signal and coded messages are directly transmitted over wire channel 301, the decoding of air-ground end-of-message signal by decoder 302 causes opening of gate 308 by bistable circuit 353 and application of reading pulses at 750 bauds of generator 304 successively to altitude reading device 112, distance counter 312 and azimuth counter 363. The order in which the three coordinates are transmitted is which is best adapted to the search of conflicts and to establishment of a block system, at its supplies criterions of aircraft separation in the order, altitude separation, reservation of fifty kilometers around the station for aircrafts at the same level, then search data for other collision dangers.

The aircraft equipment in communication with the ground equipment of FIG. 3, is represented in FIGURE 4. This equipment is not much different from equipment of FIGURE 2 and the elements which are the same in FIGURE 4 will be indicated with the same reference numbers and considered as known.

The suppression of signals S$\theta$ and S$\theta r$ and the addition of signal S$\rho$ produces the replacement of decoder 416 by a five outputs decoder 816, first output 809 for the pulses from signal S$\rho$, second output 419 and third 420 for pulses respectively from signals S$h$ and S$hr$, and fourth 421 for pulses forming ground-air coded messages. On the other hand, pulses from signal $f_1\rho(\theta)$ of VOR III by generator 401 are directly applied to AND gate 812 receiving from output 809 of decoder 816 pulses of recurrence frequency $f_2$ from signals S$\rho$. The duration of pulses from generator 401 is slightly superior to $$\delta t(\theta)=\frac{7.5°}{360°}\cdot\frac{1}{30}$$

second.

The output of gate 812 is connected to an input of AND gate 810, second input of which receives pulses from gate 415.

The output 419 of decoder 816 from which proceed pulses from signal S$h$ is connected on the one hand to OR gate 423 which also receives pulses proceeding from output 420 and, on the other hand, to the set input of bistable circuit 828 which in this condition, unblocks AND gate 827. The output of gate 810 is connected to the second input of gate 827 the output of which is connected to an input of OR gate 829 the output of which is connected to modulator 65 of DME IV. The reset input of bistable circuit 828 which in this condition blocks gate 827 is connected to the output of pulses generator 431. The remainder of the equipment represented on FIGURE 4 being identical to the corresponding parts of the equipment represented on FIGURE 2, it will be understood that the transmission by an arcraft of a response signal R to a signal $S_p$ occurs upon the coincidence of the following conditions:

The aircraft is reached by signal $S_p$ during the duration $\delta t(\theta)$ of the pulse generated by generator 401, i.e. when the phase difference between the VOR measuring and the reference signals of frequency $f_1$ is comprised between the aircraft azimuth seen from the radio beacon and $\theta+7.5°$.

The aircraft flight path level is comprised between $hd-\Delta h=hd-150m$, altitudes and $hd$ altitude indicated by the last signal $Sh$;

The aircraft has not had its transmission turn since the last signal $Sh$.

The operation of the equipment on board for indicated level volumetric sweeping of FIGURE 4 is in other respects entirely similar, more particularly concerning the coded information exchange with the ground station, to the operation of the equipment for alternate sweepings of FIGURE 2 during an indicated level cycle.

The volumetric sweeping has been described above for its application to the VORTAC radio-navigation system. The same principles may be easily applied to a radio-navigation system based on a continuous rotating surveillance radar station associated with a beacon DME/T, the transmission by aircrafts of response signals to radar pulses being then subordinated to their presence in an indicated level slice by a signal $Sh$ of DME/T. The equipments of mobile stations needed for this application can be obtained from the equipment represented on FIGURE 4 by means of obvious simplifications.

What is claimed is:

1. A radio navigation system comprising a radio beacon, means to produce a directive radiation pattern, means for producing a rotary sweep of said pattern over a given arc, means associated with said rotary sweep means for imparting to the energy transmitted from said beacon a plurality of predetermined characteristic control signals over a predetermined sector of the arc, means for advancing said predetermined sector in discrete steps over the given arc and means for effecting successive sweeps of said pattern over said given arc.

2. A system according to claim 1 wherein a first group of said plurality of said predetermined characteristic signals are indicative of radial distance ranges from said beacon, said beacon further comprises means for successively and progressively changing said distance indication characteristic up to a maximum predetermined distance in response to successive advances of said sector over said entire given arc.

3. A system according to claim 2, wherein a second group of said plurality of said predetermined characteristic signals are indicative of altitude ranges, and said beacon further comprises means for successively and progressively changing said altitude range indication up to a maximum predetermined level in response to successive advances of said sector over said entire given arc.

4. A system according to claim 1, wherein a group of said plurality of said predetermined characteristic signals are indicative of radial distance and altitude range, and said beacon further comprises means for successively and progressively changing said distance indication characteristic up to a predetermined distance for each altitude range, and for changing said altitude range indication up to a maximum predetermined level for each sector before advance to the succeeding sector.

5. A system according to claim 4, further comprising means at said beacon for receiving from craft located in the radiation field of said pattern reply signals indicative of distance and azimuth from said beacon and altitude of said craft, and display means responsive to said reply signals and to control signals of said beacon for providing a visual display representing the location parameters of said craft.

6. In a radio navigation system having a receiver and transmitter located in each of a plurality of mobile craft adapted to receive and detect signals transmitted from a beacon, said beacon having transmitting means and receiver means adapted to receive signals transmitted from said craft comprising at said beacon means to produce a directive radiation pattern, means for producing a rotary sweep of said pattern over a given arc, means associated with said rotary sweep means for imparting to the energy transmitted from said beacon a plurality of predetermined characteristic control signals over a predetermined sector of the arc, means for advancing said predetermined sector in discrete steps over the given arc and means for effecting successive sweeps of said pattern over said given arc, means on said craft for receiving said plurality of signals, means on said craft for transmitting response signals to said beacon in response to said beacon transmitted control signals and means on said beacon controlled by respose signals from one of said craft in said predetermined sector for repeating said beacon characteristic transmitted signals in said predetermined sector and for delaying advance of said sector for a predetermined time.

7. A system according to claim 6, wherein said response signals from each said craft include information data signals and said beacon further comprises means for producing operation control signals, a coding device, means for applying said operation control signals and said information data signals to said coding device, and means for transmitting output signals from said coding device to a remote indication location.

8. A system according to claim 6 wherein said beacon further comprises means to derive and transmit beacon response signals upon reception of craft response signals and said craft comprises means to detect said beacon response signals, and means to transmit coded information signals to said beacon during said predetermined time.

9. A system according to claim 8 further comprising means at said beacon for generating repetition signals at the end of said predetermined time if other craft in said predetermined sector respond to said beacon plurality of signals whereby said other craft communicate to said beacon until all of said other craft have communicated with said beacon.

10. A system according to claim 9, wherein said received response signals from each said craft include signals identifying the responding craft, and said beacon further comprises message storage means and means controlled by the identifying signals for transmitting a message from said storage means as said other information signals.

References Cited in the file of this patent

UNITED STATES PATENTS 2,666,198 Wallace --------------- Jan. 12, 1954